Nov. 30, 1943.       H. L. BOWERS       2,335,822
                        AIRPLANE
              Filed May 9, 1941      3 Sheets-Sheet 1
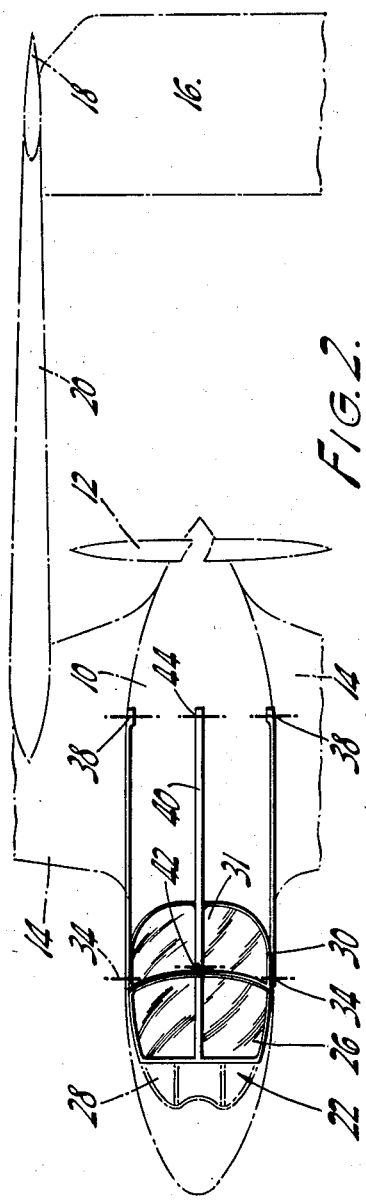
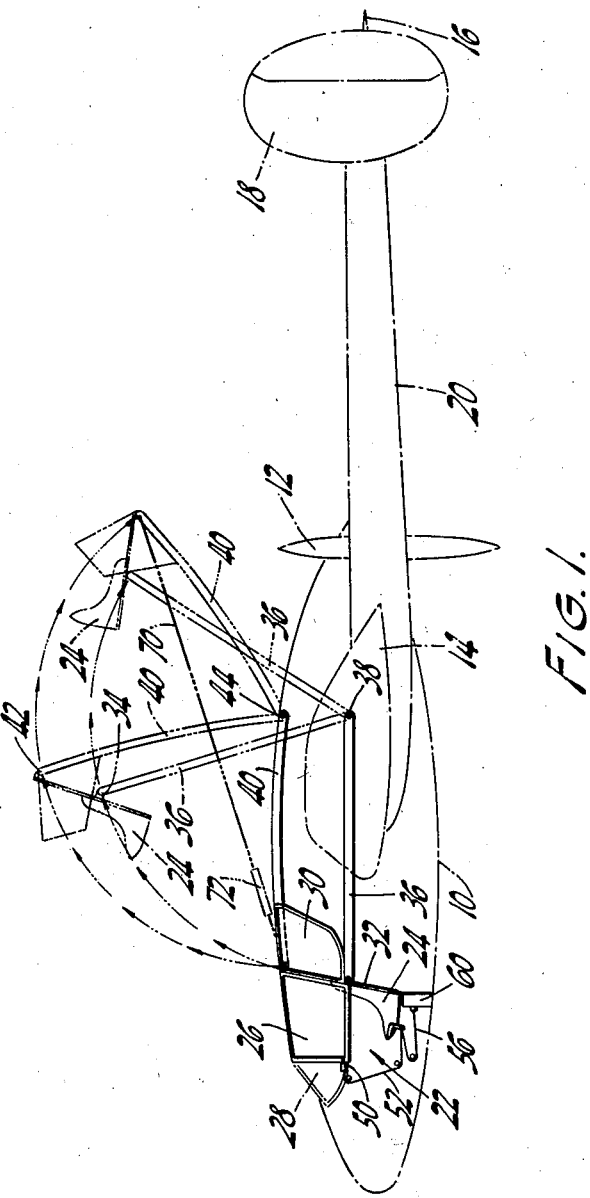
INVENTOR
*HERBERT L. BOWERS*
BY
*Bean, Brooks, Buckley & Bean*
ATTORNEYS Nov. 30, 1943.   H. L. BOWERS   2,335,822
AIRPLANE
Filed May 9, 1941   3 Sheets-Sheet 2

INVENTOR
HERBERT L. BOWERS
BY
Bean, Brooks, Buckley & Bean
ATTORNEYS

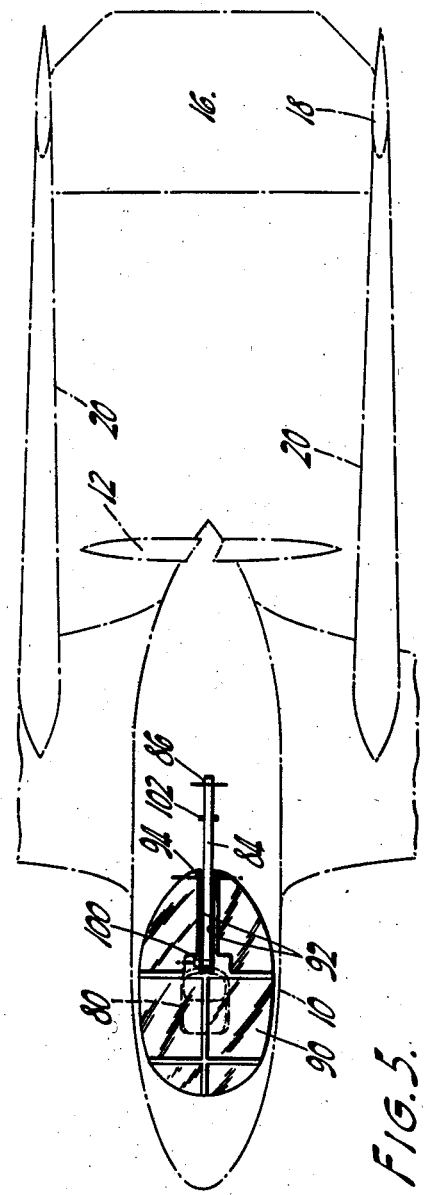
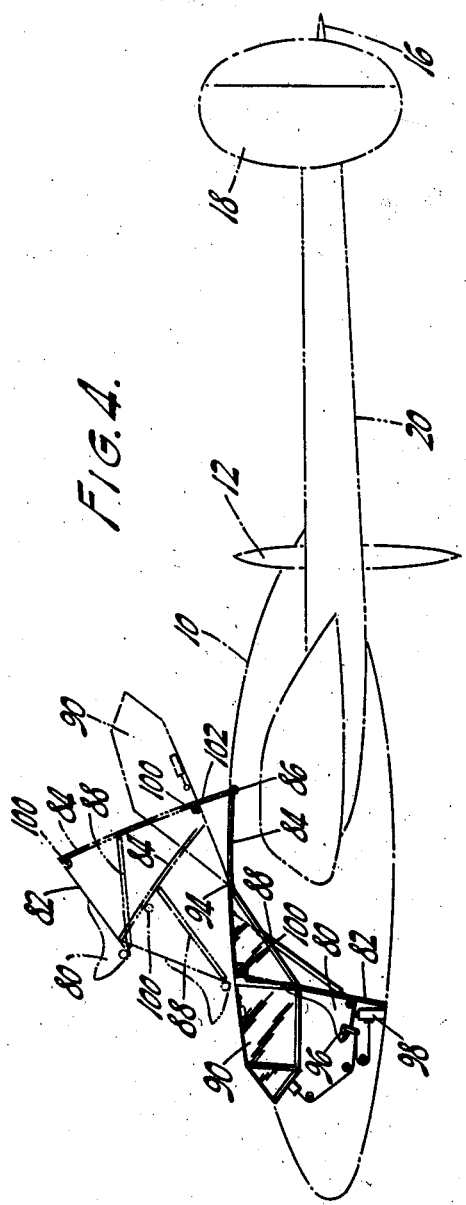

Patented Nov. 30, 1943

2,335,822

UNITED STATES PATENT OFFICE 2,335,822

AIRPLANE

Herbert L. Bowers, Kenmore, N. Y., assignor to Bell Aircraft Corporation, Buffalo, N. Y.

Application May 9, 1941, Serial No. 392,707

13 Claims. (Cl. 244—122)

This invention relates to aircraft, and more particularly to an airplane having an improved emergency exit device. The invention is particularly applicable in connection with high speed aircraft and aircraft of the so-called pusher-type or other types having propellers or elements thereof extending so as to interfere with safe exiting of person therefrom during flight as by stepping or jumping out of the usual exitway of the crew-carrying fuselage or nacelle preparatory to parachute landings.

Modern airplane design practice usually provides for installation of a multitude of control mechanisms within the bottom portion of the fuselage in the region of the passenger compartment because of the necessary disposition of the landing gear and of the many control devices within the region thereof. Consequently, it is usually impracticable in the case of modern pusher type airplanes to provide for emergency exiting of the pilot and passengers downwardly through the bottom wall of the fuselage in such manner as would insure that the exiting persons would fall clear of the following propeller and empennage structures. Also, it is impracticable in connection with most pusher airplane designs to arrange that the pilot and passengers step or jump sidewise out of the airplane for emergency exiting purposes without incurring the hazard of falling into the path of the following propellers; and it is the primary object of the present invention to provide an improved airplane including a novel emergency escape mechanism which is adapted to forcibly project the occupant against the forces of gravity upwardly to a predetermined distance above the airplane prior to release therefrom whereby the occupant will be catapulted clear of the path of projecting portions of the airplane located aft of the crew compartment, and whereby possibility of injurious contact with such projecting portions is eliminated.

Another object of the invention is to provide an airplane including an improved emergency occupant exit mechanism which is adapted to positively lift the occupant in an improved manner against the operation of the forces of gravity to an elevated position above the airplane for subsequent release of the occupant therefrom at such position relative to the airplane that the occupant is clear of the path of following projecting portions of the airplane. Another object of the invention is to provide a mechanism for the above stated purposes which employs naturally available forces of the relative airstream for actuating the escape mechanism to the elevated discharge position thereof, in an improved manner. Another object of the invention is to provide an improved mechanism for the purpose described which is adapted to avoid imposition of too drastic catapulting forces upon the occupant during the initial stage of the exiting operation, such as would otherwise cause injury to the occupant. Another object of the invention is to provide an improved mechanism for the purpose described which is adapted to initially elevate the occupant while being supported in substantially normal attitude, and to subsequently impart to the occupant a change of attitude and an ejecting impetus for discharging the occupant from the mechanism in an improved manner.

Another object of the invention is to provide an improved form of emergency exit device for aircraft which is adapted to automatically displace the occupant laterally from the aircraft under flight conditions in such manner that the occupant is thereupon projected from the aircraft so as to be clear of the path of projecting elements of the aircraft structure located aft of the occupant carrying compartment, such as the aircraft propeller, empennage structure, and the like. Another object of the invention is to provide an improved airplane of the type wherein the engine propeller is located at the rear end portion of the occupant carrying nacelle or fuselage portion of the aircraft. Other objects and advantages of the invention will appear in the specification hereinafter.

In the drawings:

Fig. 1 is a diagrammatic side elevation of a pilot emergency exit device of the invention arranged in conjunction with a pusher-type airplane;

Fig. 2 is a fragmentary plan of the device of Fig. 1;

Fig. 4 is a view corresponding to Fig. 1 of another form of the invention; and

Fig. 5 is a fragmentary plan of the device of Fig. 4.

Figure 3:
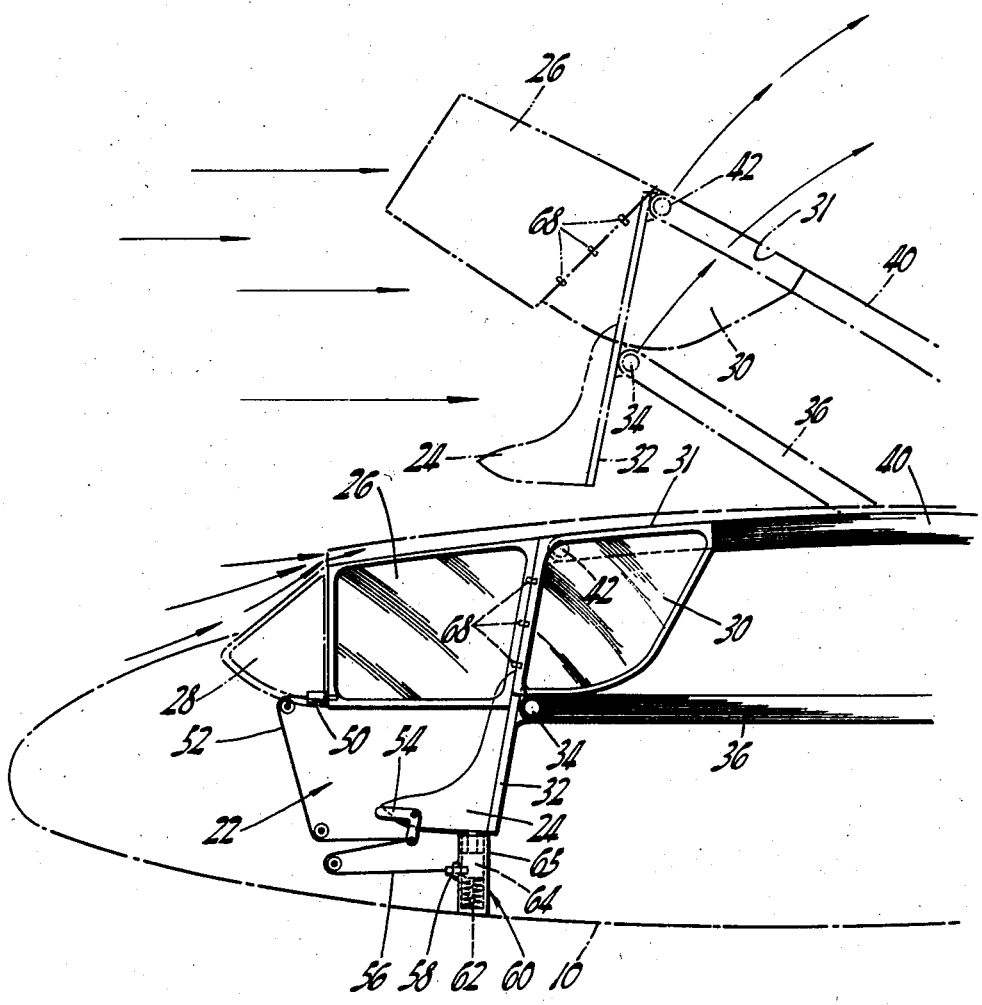
Fig. 3 is an enlarged view of portions of Fig. 1, showing in broken lines the exit mechanism in an intermediate position of operation.

The invention is illustrated in conjunction with an airplane illustrated generally as including a fuselage 10 and having a propeller 12 disposed at the rear end thereof. Wings 14 extend from opposite sides of the fuselage, and the empennage horizontal and vertical fin structures 16 and 18 are mounted upon booms 20 extending rearwardly from the wings 14. The pilot compartment is indicated generally at 22, and is disposed at the forward end of the fuselage 10 for maximum visibility and other purposes. The pilot seat is indicated at 24, and it is thus seen that the airplane illustrated is one of the type wherein the pilot compartment is so situated that if the pilot attempted to leave the airplane during flight by simply climbing out of the compartment 22 and jumping downwardly or sidewise into the adjacent airstream he would probably come into harmful contact with the following propeller 12 or the empennage structures 16—18 of the airplane. While the invention is illustrated in connection with an airplane in which the horizontal and vertical airfoils of the empennage group are carried by a pair of booms, it will be understood that the invention is adaptable to equal advantage in connection with any other type of airplane having projecting elements located rearwardly of the occupant-carrying compartment so that the hazard of injury to persons stepping out of the airplane through openings in the compartment walls would exist.

It will be understood that the pilot of the airplane may enter the compartment 22 through any suitable passageway (not shown) located in any convenient wall portion of the fuselage 10, and that no particular cooperation is contemplated between the usual passageway for entrance and exit of the airplane occupants when the airplane is grounded and the emergency exit mechanism of the invention.

The upper portion of the fuselage in the region of the passenger compartment is enclosed by a windowed canopy 26 corresponding generally to the customary canopy of the conventional airplane to provide for visibility of the occupants outwardly of the airplane. A windscreen 28 of transparent material is also fixed to the fuselage to provide a transparent section of the compartment enclosure at the forward end thereof through which the occupants may look in the direction of flight. Another transparent panel section 30 of the compartment enclosure is arranged to extend about opposite side and the top portion of the compartment enclosure just rearwardly of the position of the pilot when seated in the seat 24, for purposes of pilot visibility in rearward directions.

The pilot seat 24 and the canopy sections 26 and 30 are arranged to be normally disposed in the solid line positions thereof of Figs. 1 to 3, but these elements of the structure are mounted upon a displacement mechanism so as to be adapted to be projected through the various broken line positions thereof of the drawings, for the purposes of the pilot ejecting operation of the invention. To this end the seat 24 is fixedly mounted upon a bracket 32 which is carried at its opposite sides by means of pivotal connections 34 by the forward end portions of a pair of arms 36 disposed to extend along corresponding side portions of the fuselage 10 into pivotal connections therewith at positions substantially rearwardly of the pilot compartment as at 38. A stabilizer arm 40 is pivotally connected as at 42 to the central upper end portion of the bracket 32 and in vertically spaced relation from the line of the pivotal axes 34, and the stabilizer arm 40 is pivotally connected at its opposite end to a fixed portion of the fuselage 10 in the region of the pivotal connections 38 but in vertically spaced relation therefrom, as at 44, so as to provide substantially a parallelogram linkage device upon which the bracket 32 is mounted for rotation relative to the fuselage as illustrated diagrammatically in Fig. 1.

It will be noted that the pivotal connection 44 is disposed substantially directly above the line of the pivotal axes 38, and therefore as the ejecting mechanism moves toward the rearmost broken line position thereof of Fig. 1 the stabilizer arm 40 causes the bracket 32 to rotate relative to the arms 36, as illustrated. During initial phases of the bracket raising operation the rotational movement imparted to the bracket 32 is of minor order, as illustrated in Fig. 3 and at the intermediate broken line position of Fig. 1; but upon arrival of the bracket 32 at positions substantially above the position of the pivotal axes 38—44—further rearward movement of the mechanism causes the bracket 32 to be relatively rapidly rotated and inclined rearwardly toward a substantially horizontally disposed attitude, as illustrated at the right hand broken line position thereof of Fig. 1.

The pilot seat 24 is fixedly mounted upon the lower end of the bracket 32 so as to be normally supported thereby in a position suitable for convenient seating of the pilot in the customary manner, as illustrated by the solid line position of the mechanism of Figs. 1 to 3. Upon elevation of the exit mechanism through the positions illustrated by broken lines of Fig. 1 the seat 24 will be carried by the arms in such manner as to positively displace the pilot upwardly and out of the path of the following propeller 12 and the empennage structures 16—18. During the initial phases of this elevating movement the pilot's seat remains supported in substantially normal attitude, but during the later phases of the mechanism movement the seat is relatively rapidly tilted rearwardly so as to dispose the occupant in a substantial horizontal attitude against the back portion of the seat.

The power for actuating the displacement mechanism of the invention is arranged to be supplied by the effects of flight motion of the aircraft relative to the surrounding airstream, whereby the provision of an otherwise unnecessary mechanical power supply mechanism is avoided, and whereby an improved form of displacement and ejection operation is obtained. The rear canopy portion 30 is of inverted U-shaped sectional form and comprises a pair of opposite side panels and a top panel 31 of plane form which is adapted to function as an airfoil upon impingement of an airstream thereagainst from within the compartment 22 for lifting the forward end of the stabilizer arm 40 and the mounted bracket 32 so as to swing the parallelogram link structure about the pivot axes 38—44.

The displacement mechanism is arranged to be detachably locked in normal inoperative position upon the fuselage 10, as by means of a latch device 50 which is arranged to be unlocked by means of a pull cable 52 associated with a manually operable lever 54 disposed within convenient reach of the pilot when seated in the seat 24. A second cable 56 is also connected to the lever 54 for actuation of a second release mechanism 58 associated with a starter device 60 which may be of any suitable form of impulse delivering mechanism adapted to lift the seat carrying bracket 32 a distance sufficient to raise the canopy sections which are connected to the bracket 32 out of registry with the upper rear edge portion of the fixed windscreen 28 so that the airstream in the region of the canopy will enter the compartment 22 under the top portions of the canopy sections 26—30 so as to press upwardly thereagainst to cause the displacement mechanism to be elevated and rotated about the pivotal axis defined by the connections 38—38. As illustrated, the starter device 60 may comprise a preloaded compression spring 62 arranged to press against a plunger 64 slidably mounted within a housing 65 for transmitting upward lifting pressures against the seat 24 upon release of the locking mechanism 58, as explained hereinabove.

The forward canopy section 26 is detachably mounted upon the forward edge portion of the canopy portion 30 in such manner as to be normally rigidly connected thereto and to resist vertically or rearwardly directed forces tending to disengage the canopy section 26 from the canopy portion 30 when the displacement mechanism is in inoperative position. For example, the means of connection between the canopy section 26 and the canopy portion 30 may comprise a series of dowel pin devices 68 as illustrated in Fig. 3; the dowel pin devices being arranged to extend into slide-fitting connection with contiguously disposed portions of the canopy sections 26—30. Thus, the dowel connection devices are adapted to normally maintain the canopy section 26 against displacement out of connected relation with the canopy section 30 which is rigidly carried by the arm 40.

Consequently, an airplane is provided which includes a normally closed fuselage of streamline form in which the passenger compartment is enclosed by a canopy section mounted upon a pivotable arm structure extending into pivotal connection with the fuselage at a position substantially spaced rearwardly of the canopy section. The canopy section is normally locked in fuselage enclosing relation but is releasable therefrom to allow the starter mechanism to lift the canopy section to an extent sufficient to allow the outside airstream to enter the passenger compartment under the leading edge of the canopy section, whereupon the windstream will be enabled to apply lifting forces against the upper portion of the canopy section so as to cause the exit gear to be rotated about the pivotal connections 38—44 to the fuselage 10. Consequently, to effect an emergency exit during flight, the pilot or other seat occupant simply depresses the lever 54. The latch mechanism 50 is thereby released and the starter mechanism 60 is freed to lift the seat carrying bracket 32 to a slightly elevated position whereby the upper portion of the canopy structure is elevated, as from the solid line position thereof of Fig. 3 to the broken line position of Fig. 3. Thereupon the outside airstream is enabled to enter the compartment 22, as indicated by the arrows in Fig. 3, and the left component of the force of the entering airstream operates against the canopy structure so as to cause the displacement gear to rotate about the axes 38—44, as illustrated by the successive broken line positions thereof in Figs. 1 and 3.

It will be noted that, as illustrated in Fig. 3, as the displacement mechanism swings upwardly above the airplane the attitudes of the dowel connection devices 68 shift from substantially horizontal toward vertically inclined positions, and that the lifting forces of the airstream impinging against the under surface of the canopy section 26 are then enabled to cause the canopy section 26 to rotate against the upper leading edge portion of the canopy section 30 and the dowell devices are thus withdrawn from operative connection and the canopy section 26 is thereby freed so that it blows away from the remainder of the displacement gear subsequent to having assisted in the initial operation of lifting the seat carrying bracket. Thus, as the seat carrying bracket portion of the mechanism swings into elevated position and approaches the highest position of its arc of travel about the pivotal axes 38—44 the forward canopy section 26 is automatically removed from the mechanism, and the seat carrying bracket is then relatively rapidly tilted rearwardly from its original vertically disposed attitude, whereby the occupant of the seat 24 is thereupon disposed in reclining attitude against the back portion of the seat 24 and is free to slide therefrom in response to the forces of the relative airstream, but at an elevation spaced substantially above the path of the following propeller 12 and/or the empennage structures 16—18. Preferably, a check cable 70 is provided as illustrated in Fig. 1 to check the rearward pivotal movement of the displacement gear, at least momentarily, upon arrival of the seat 24 at the elevated and rearwardly tilted position thereof illustrated by the drawings for preferred discharge of the occupant from the seat 24; and a cushioning device 72 may be installed in the line of the cable 70 to cushion the impact forces thereon at the time of arrival of the displacement gear at the pilot discharge position so as to avoid premature disruption of the displacement gear mechanism.

Thus, it will be understood that upon arrival of the seat 24 at the position of preferred discharge of the occupant therefrom, the seat is automatically given a backwardly tilting flip by reason of the cooperation of the pivot control arms 36—40; and upon arrival of the seat at the point of occupant discharge the motion of the gear is momentarily checked so that the occupant is in effect catapulted from the seat by reason of the operation of forces of momentum in cooperation with the forces of the relative airstream operating against the occupant's body, whereby the occupant will be discharged clear of the following projecting portions of the airplane structure in an improved manner.

Figs. 4 and 5 illustrate another form of the invention wherein the pilot's seat 80 is supported upon a carrying bracket 82 which is substantially similar to the bracket 32 previously described, except that the bracket 82 is hingedly connected at its upper end to the forward end of a single displacement strut 84 which is pivotally mounted at its rear end by means of a connection 86 to the airplane fuselage 10. A seat stabilizing strut 88 is connected at its opposite ends to the bracket 82 and to the strut 84 so as to provide a diagonal brace therebetween. The strut 88 is of extensible form and includes a tension member which is arranged to be in biased condition when the gear is in the normal inoperative solid line position of Fig. 4. However, as the displacement gear rotates upwardly about the pivotal axis 86 the seat carrying bracket 82 is freed from the contiguously disposed portion of the airplane fuselage and the strut 88 is enabled to contract to change the angular disposition of the bracket 82 relative to the strut 84, as illustrated by the successive broken line positions of the gear in Fig. 4.

The canopy section 90 of the fuselage crew compartment of Figs. 4 and 5 is arranged to straddle the strut 84, as at 92, (Fig. 5) and the canopy is pivotally connected to the fuselage as at 94. A gear release mechanism similar to that described hereinabove in connection with Figs. 1 to 3 is arranged to be actuated by depression of a pilot operable lever 96 so that the canopy section 90 of the fuselage will be released for pivotal movement upwardly and backwardly about the axis of the connection 94; and a starter device 98 will be simultaneously actuated to initiate the lifting and rotating operation of the canopy structure. The canopy structure carries a roller 100 which is arranged to engage against the under surface of the strut 84 in such manner that as the canopy section 90 pivots upwardly and rearwardly under the action of the relative airstream force engaging under the canopy roof, as in the case of the canopy operation explained hereinabove, the roller 100 will operate against the strut 84 to cause the latter to pivot upwardly about its pivotal connection 86 so as to carry the pilot's seat 80 to successively higher positions above the fuselage 10 for ejection of the occupant therefrom in such manner as to clear the airplane propeller and empennage structure, as explained hereinabove. Preferably, a stop member 102 will be arranged to extend from the strut 84 so as to limit the rearward movement of the canopy section 90 relative to the strut 84, as illustrated, at the extreme rearward broken line position of Fig. 4.

Thus, it will be understood that the invention contemplates the pivotable mounting of a frame structure upon the aircraft for carrying the occupant supporting structure thereof, and arrangement of a windstream-responsive vane in combination with the movable frame structure in conjunction with controllable means for directing an airstream thereagainst for development of airstream pressure forces acting against the vane member so as to cause forcible displacement of the occupant carrying structure away from the aircraft prior to discharge of the occupant therefrom, so that the occupant will fall clear of the path of projecting portions of the aircraft located aft of the passenger carrying compartment. It will be understood that in lieu of the specific starter mechanisms 60—98 of the drawings herein any other suitable means for providing access to the seat displacing vane element of the mechanism by the relative airstream may be employed. Also, the displacement force providing vane element of the mechanism may constitute any other suitable portion of the aircraft structure in lieu of the specific canopy structure as described hereinabove; and that the admission of a propelling airstream thereagainst may be effected through other suitable means such as a conduit adapted to receive an airstream at the forward end of the aircraft and to discharge the the airstream against the vane element in such manner as to cause the vane to move in any desired direction to provide the occupant ejecting action of the invention. Such conduit means may be arranged, for example, to be in open communication with a port located at the nose of the fuselage, and the flow of air through the conduit may be controlled by means of a suitable valve mechanism arranged to be operable by the aircraft crew.

It will also be understood that the invention contemplates an emergency exit mechanism which is arranged to catapult an occupant outwardly of the aircraft in any desired direction therefrom through utilization of pressure forces developed by impingement of the relative airstream upon vane means arranged to be extended into coaction with the adjacent airstream, and that by reason of the airstream pressure action and the pivotal support arm mechanism of the invention the occupant-ejecting operation is of such character as to be relatively slow acting during the initial stages thereof and at increased rates of acceleration during the later stages thereof whereby the forces of acceleration acting upon the occupant are so adjusted as to avoid injury to the occupant while a suitable ultimate rate of catapulting movement is finally attained.

Although only a limited number of forms of the invention have been illustrated and described in detail, it will be apparent to those skilled in the art that the invention is not so limited but that various changes may be made therein without departing from the spirit of the invention or the scope of the appended claims.

I claim:

1. In an aircraft having an occupant-carrying compartment including a canopy normally constituting a closure for a portion of said compartment, said canopy being hingedly connected to said aircraft at a position rearwardly of said compartment, an occupant-carrying seat suspended from said canopy ahead of said hinged connection, and means operable to permit entrance of an airstream into said compartment to effect lifting of said canopy.

2. An emergency exit device for an aircraft having an occupant-carrying compartment including a canopy normally constituting a closure for a portion of said compartment, said canopy being hingedly connected to said aircraft, at a position rearwardly of said compartment, an occupant-carrying seat suspended from said canopy ahead of said hinged connection, and means operable to permit entrance of an airstream into said compartment to effect lifting of said canopy for displacing said seat outwardly of said aircraft.

3. In an aircraft, a seat normally disposed within said aircraft, a displacement gear connected to said seat and extending therefrom longitudinally of said aircraft into pivotal connection therewith, air pressure-responsive vane means normally constituting a wall portion of said aircraft and connected to said gear at a position spaced from said pivotal connection, and means operable to permit controlled impingement of an airstream against said vane to apply airstream pressure forces thereagainst for causing said gear to pivot relative to said aircraft to displace said seat outwardly therefrom, said gear comprising a seat carrying bracket normally disposed substantially vertically and pivotally connected at vertically spaced positions to strut members extending into pivotal connection with said aircraft whereby said gear is adapted to tilt said seat simultaneously as the latter is displaced outwardly of said aircraft.

4. In an airplane, a body portion including a passenger compartment, a canopy comprising a partial closure for said compartment, said canopy being pivotally connected adjacent its rear end to said airplane and adapted to swing about said pivotal connection away from said airplane, a passenger seat normally disposed within said compartment and mounted upon a bracket which is pivotally connected to said airplane at a position spaced from said pivotal connection of said canopy to said airplane, and means interengaging said canopy and said bracket adapted to transmit outwardly swinging motion of said canopy into outwardly displacing motion of said bracket, releasable means normally locking said canopy in fixed relation upon said airplane, and means for directing an airstream behind said canopy so as to cause the latter to transmit outwardly displacing movements to said bracket, said passenger seat mounting bracket being extensible-contractible and operatively associated with said airplane so as to automatically contract during the initial stages of outwardly displacing movements thereof.

5. An emergency exit device for an aircraft having an occupant-carrying compartment and a canopy normally constituting a closure for a top portion of said compartment, said canopy including a rear section permanently mounted rearwardly thereof to said aircraft by means of a pivotal connection device and a forward section normally articulated to said rear section by means of a detachable connection device, a passenger support suspended from said rear canopy section forwardly of said pivotal connection device, detachable latch means normally maintaining said canopy in locked compartment closing position, and control means operable to permit entrance of an airstream from externally of said aircraft into said compartment to apply lifting forces against said canopy forward and rear sections and to simultaneously release said latch means, whereby said canopy effects lifting displacement of said support outwardly of said aircraft and said forward canopy section is freed to blow clear of said rear section under the effects of the airstream externally of said aircraft.

6. In an aircraft, a frame connected pivotally to said aircraft at one end of said frame, a passenger support mounted upon said frame at a position spaced from the pivotal connection thereof, airstream-responsive vane means operatively coupled with said frame and arranged to transmit airstream pressure forces thereto so as to cause said frame to pivot relative to said aircraft to displace said support means outwardly thereof, and means operable to control pivotal movement of said frame including movement check means operatively associated with said frame so as to suddenly halt the pivotal movement thereof subsequent to displacement of said passenger support to its furthermost distance from said aircraft.

7. In an airplane, a body portion including a passenger compartment, a canopy comprising a partial closure for said compartment, said canopy being pivotally connected adjacent its rear end to said airplane and adapted to swing about said pivotal connection away from said airplane, a passenger seat normally disposed within said compartment and mounted upon a bracket which is pivotally connected to said airplane at a position spaced from said pivotal connection of said canopy to said airplane, and means interengaging said canopy and said bracket adapted to transmit outwardly swinging motion of said canopy into outwardly displacing motion of said bracket, releasable means normally locking said canopy in fixed relation upon said airplane, and means for directing an airstream behind said canopy so as to cause the latter to transmit outwardly displacing movements to said bracket.

8. In an aircraft, a seat normally disposed within said aircraft, a displacement gear connected to said seat and extending therefrom longitudinally of said aircraft into pivotal connection therewith, air pressure-responsive vane means normally constituting a wall portion of said aircraft and connected to said gear at a position spaced from said pivotal connection, means operable to permit controlled impingement of an airstream against said vane to apply airstream pressure forces thereagainst for causing said gear to pivot relative to said aircraft to displace said seat outwardly therefrom, said gear comprising a seat carrying bracket normally disposed substantially vertically and pivotally connected at vertically spaced positions to a pair of strut members extending normally in spaced substantially parallel and horizontal directions into pivotal connection with said aircraft at corresponding vertically spaced positions, whereby said gear is adapted to control the attitude of said seat carrying bracket during the displacement operation in such manner that during the initial phase of the operation said seat bracket remains in substantially vertically extending attitude until said seat is disposed in the region of outermost displacement relative to the aircraft whereupon said seat bracket is relatively rapidly rotated by the pivoting action of said strut members into backwardly reclining attitude.

9. In an aircraft having an occupant-carrying compartment including a canopy normally constituting a closure for a portion of said compartment, said canopy being hingedly connected to said aircraft at a position rearwardly of said compartment, an occupant-carrying seat suspended from said canopy ahead of said hinged connection, and manually controlled power means operable to force said canopy to move outwardly relative to the aircraft so as to intercept the relative airstream externally thereof to permit entrance of an airstream into said compartment to effect lifting of said canopy for bodily lifting said seat and the occupant thereof against forces of gravity to a position clear of said aircraft.

10. In an airplane, a body portion including a passenger compartment, a canopy comprising a partial closure for said compartment, said canopy being pivotally connected adjacent its rear end to said airplane and adapted to swing about said pivotal connection away from said airplane, a passenger seat normally disposed within said compartment and mounted upon a bracket which is pivotally connected to said airplane at a position spaced from said pivotal connection of said canopy to said airplane, and means interengaging said canopy and said bracket adapted to transmit outwardly swinging motion of said canopy into outwardly displacing motion of said bracket, releasable means normally locking said canopy in fixed relation upon said airplane, and manually controlled power means adapted to force said canopy to move for directing an airstream behind said canopy so as to cause the latter to transmit outwardly displacing movements to said bracket.

11. In an aircraft having an occupant-carrying compartment including a canopy normally constituting a closure for a portion of said compartment, said canopy being hingedly connected to said aircraft, an occupant-carrying seat suspended from said canopy, and means controllably operable to permit entrance of an airstream into said compartment to effect lifting of said canopy.

12. In an airplane, a body portion including a passenger compartment, a canopy comprising a partial closure for said compartment, said canopy being pivotally connected adjacent its rear end to said airplane and adapted to swing about said pivotal connection away from said airplane, a bracket pivotally mounted upon said airplane, a passenger seat normally disposed within said compartment and pivotally suspended from said bracket at a position spaced from said pivotal connection of said bracket to said airplane, means interengaging said canopy and said bracket adapted to translate outwardly swinging motion of said canopy into outwardly displacing motion of said bracket, releasable means normally locking said canopy in fixed relation upon said airplane, means for directing an airstream behind said canopy so as to cause the latter to transmit outwardly displacing movements to said bracket, and a diagonal strut extending between said bracket and said seat so as to control the relative angular disposition thereof, said strut being longitudinally elastic and adapted to contract upon swinging of said bracket outwardly of the airplane to contract the relative angular disposition of said bracket and said seat.

13. In an aircraft having an occupant-carrying compartment including a canopy normally constituting a closure for a portion of said compartment, said canopy comprising a roof portion and a leg portion being hingedly connected to said aircraft at a position rearwardly of said compartment, an occupant-carrying seat suspended from said canopy ahead of said hinged connection, and means controllably operable to permit entrance of an airstream into said compartment to effect lifting of said canopy, said canopy roof portion being adapted to automatically disengage from said canopy leg portion upon pivoting of said canopy about the hinged connection with the aircraft.

HERBERT L. BOWERS.